US010534689B2

(12) United States Patent
Ramanathan et al.

(10) Patent No.: US 10,534,689 B2
(45) Date of Patent: Jan. 14, 2020

(54) DATA STRUCTURE ABSTRACTION FOR MODEL CHECKING

(71) Applicant: Tata Consultancy Services Limited, Mumbai (IN)

(72) Inventors: Venkatesh Ramanathan, Pune (IN); Anushri Jana, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 331 days.

(21) Appl. No.: 15/448,097

(22) Filed: Mar. 2, 2017

(65) Prior Publication Data

US 2017/0262356 A1    Sep. 14, 2017

(30) Foreign Application Priority Data

Mar. 9, 2016   (IN) .............................. 201621008284

(51) Int. Cl.
*G06F 11/36*   (2006.01)
*G06F 8/51*    (2018.01)
*G06F 9/445*   (2018.01)

(52) U.S. Cl.
CPC ............ *G06F 11/3608* (2013.01); *G06F 8/51* (2013.01); *G06F 9/44589* (2013.01); *G06F 11/3604* (2013.01)

(58) Field of Classification Search
CPC ... G06F 11/3604–3608; G06F 9/44589; G06F 8/43–437; G06F 8/51
See application file for complete search history.

(56) References Cited

U.S. PATENT DOCUMENTS 7,058,925 B2    6/2006   Ball et al.
8,473,883 B2 *  6/2013   German ............... G06F 17/504
                                                      703/2

(Continued)

FOREIGN PATENT DOCUMENTS

IN    2012MUM480    3/2014

OTHER PUBLICATIONS

Jana, A., et al., Scaling Bounded Model Checking by Transforming Programs with Arrays [version 4], arXiv.org [online], 2017 [retrieved Mar. 23, 2019], Retrieved from Internet: <https://arxiv.org/pdf/1606.06974.pdf>, pp. 1-22.*

(Continued)

*Primary Examiner* — Todd Aguilera
(74) *Attorney, Agent, or Firm* — Finnegan, Henderson, Farabow, Garrett & Dunner LLP (57) ABSTRACT

This disclosure relates generally to data structure abstraction, and more particularly to method and system for data structure abstraction for model checking. In one embodiment, the method includes identifying data structure accesses in the source code. Loops are identified in the data structure accesses, and loop-types are identified in the loops. An abstracted code is generated based on the loop types for abstracting the data structure. Abstracting the data structure includes, for each loop, replacing the data structure accesses by one of a corresponding representative element and a non-deterministic value in the loop body of said loop based on elements accessed, and eliminating loop control statement of said loop operating on elements of data structure based on loop type of said loop, and adding a plurality of non-array assignments at a start and after the loop body of the source code. The abstracted code is provided for the model checking.

19 Claims, 2 Drawing Sheets

(56) References Cited

U.S. PATENT DOCUMENTS

| | | | |
|---|---|---|---|
| 8,612,938 B2* | 12/2013 | Prasad | G06F 11/3684 |
| | | | 717/124 |
| 8,627,273 B2 | 1/2014 | Baumgartner et al. | |
| 9,158,506 B2* | 10/2015 | Darke | G06F 11/3608 |
| 2005/0166167 A1 | 7/2005 | Ivancic et al. | |
| 2008/0098347 A1 | 4/2008 | Chockler et al. | |
| 2010/0175052 A1* | 7/2010 | Prasad | G06F 11/3612 |
| | | | 717/128 |
| 2015/0242188 A1* | 8/2015 | Darke | G06F 8/30 |
| | | | 717/106 |

OTHER PUBLICATIONS

Darke, P., et al., Precise Analysis of Large Industry Code, 19th Asia-Pacific Software Engineering Conf. [online], 2012 [retrieved Mar. 23, 2019], Retrieved from Internet: <https://ieeexplore.ieee.org/abstract/document/6462668>, pp. 306-309.*

* cited by examiner

DATA STRUCTURE ABSTRACTION FOR MODEL CHECKING

PRIORITY CLAIM

This U.S. patent application claims priority under 35 U.S.C. § 119 to: India Application No. 201621008284, filed on Mar. 9, 2016. The entire contents of the aforementioned application are incorporated herein by reference.

TECHNICAL FIELD

This disclosure relates generally to data structure abstraction, and more particularly to method and system for data structure abstraction for model checking.

BACKGROUND

Computer programs, also referred to as software programs, include codes written in a programming language to perform certain tasks in a computing device on which the computer program is executed. Examples of computing devices include, but are not limited to, a laptop, personal digital assistant (PDA), computer, mobile phone, and so on. Verification of the codes is of utmost importance for safe running of software programs. For example, it is imperative to perform defect detection in all kinds of software programs.

Static analysis is commonly used technique for sound defect detection. Static analysis includes verification by static verifiers to perform defect detection for any given input, to thereby demonstrate program correctness. Another technique for verification of software programs includes model checking. Model checking includes verifying correctness of programs by model checkers. Model checking can be utilized for effectively checking properties of programs involving scalars.

The inventors here have recognized several technical problems with such conventional systems for defect detection or verification of programs, as explained below. The verification performed by static analysis is scalable, however, it has been observed that it is imprecise for verification of codes. The technique of model checking is effective for checking properties of programs involving scalars, however, while model checking the programs involving data structures, such as arrays and C style structures, the programs often runs into a state space explosion. Since real life programs are replete with such data structures, model checking is ineffective for such programs.

SUMMARY

Embodiments of the present disclosure present technological improvements as solutions to one or more of the above-mentioned technical problems recognized by the inventors in conventional systems. For example, in one embodiment, a processor-implemented method for data structure abstraction for model checking is provided. The method includes receiving a source code for abstraction, via one or more hardware processors. Further, the method includes identifying, via the one or more hardware processors, one or more data structure accesses in the source code, where the one or more data structure accesses includes expressions for referencing elements of the data structures to access the data structure in the source code. Furthermore, the method includes identifying, via the one or more hardware processors, one or more loops in the one or more data structure accesses. A loop of the one or more loops comprising control statement and a loop body, wherein the loop causes the loop body to be repeatedly executed based on the control statement. Moreover, the method includes identifying, via the one or more hardware processors, one or more loop-types in the one or more loops. Also, the method includes generating, via the one or more hardware processors, an abstracted code based on the one or more loop types, the abstracted code capable of abstracting the data structure, wherein abstracting the data structure comprises performing for each loop of the one or more loops: replacing the one or more data structure accesses by one of a corresponding representative element and a non-deterministic value in the loop body of said loop based on the elements accessed of the data structure, and eliminating loop control statement of said loop operating on elements of the data structure based on loop type of said loop, and adding a plurality of non-array assignments at a start of the loop body and after the loop body of the source code. Also, the method includes providing the abstracted code for the model checking, via the one or more hardware processors.

In another embodiment, a system for data structure abstraction for model checking is provided. The system includes at least one memory; and one or more hardware processors, the at least one memory coupled to the one or more hardware processors wherein the one or more hardware processors are capable of executing programmed instructions stored in the at least one memory to receive a source code for abstraction. Further, the one or more hardware processors are capable of executing programmed instructions to identify one or more data structure accesses in the source code, where the one or more data structure accesses includes expressions for referencing elements of the data structures to access the data structure in the source code. Furthermore, the one or more hardware processors are capable of executing programmed instructions to identify one or more loops in the one or more data structure accesses. A loop of the one or more loops comprising control statement and a loop body, wherein the loop causes the loop body to be repeatedly executed based on the control statement. Moreover, the one or more hardware processors are capable of executing programmed instructions to identify one or more loop-types in the one or more loops. Also, the one or more hardware processors are capable of executing programmed instructions to generate an abstracted code based on the one or more loop types, the abstracted code capable of abstracting the data structure, wherein abstracting the data structure include performing for each loop of the one or more loops: replacing the one or more data structure accesses by one of a corresponding representative element and a non-deterministic value in the loop body of said loop based on the elements accessed of the data structure, and eliminating loop control statement of said loop operating on elements of the data structure based on loop type of said loop, and adding a plurality of non-array assignments at a start of the loop body and after the loop body of the source code. Also, the one or more hardware processors are capable of executing programmed instructions to provide the abstracted code for the model checking.

In yet another embodiment, a non-transitory computer-readable medium having embodied thereon a computer program for executing a method for data structure abstraction for model checking is provided. The method includes receiving a source code for abstraction. Further, the method includes identifying one or more data structure accesses in the source code, where the one or more data structure accesses includes expressions for referencing elements of the data structures to access the data structure in the source code. Furthermore, the method includes identifying one or more loops in the one or more data structure accesses. A loop of the one or more loops comprising control statement and a loop body, wherein the loop causes the loop body to be repeatedly executed based on the control statement. Moreover, the method includes identifying one or more loop-types in the one or more loops. Also, the method includes generating an abstracted code based on the one or more loop types, the abstracted code capable of abstracting the data structure, wherein abstracting the data structure comprises performing for each loop of the one or more loops: replacing the one or more data structure accesses by one of a corresponding representative element and a non-deterministic value in the loop body of said loop based on the elements accessed of the data structure, and eliminating loop control statement of said loop operating on elements of the data structure based on loop type of said loop, and adding a plurality of non-array assignments at a start of the loop body and after the loop body of the source code. Also, the method includes providing the abstracted code for the model checking.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In a software code, data structure operations generally occur in a loop. Herein a data structure may be referred to as a way of organizing data in a computer for enabling an effective usage of data. While executing programs (or software codes) with data structures, errors may be encountered in cases of indefinite loops or loops having large loop bounds depending on the size of the data structures. Herein, the loop bounds may be understood as the maximum number of times a loop has to be executed. Generally, in order to ensure error free execution of the program, the program is initially checked for errors, for example, by a program analyzer or a model checker of the computer device. The model checker is configured to analyze the program and check for various errors that may occur on execution of the program. However, for the loops with non-deterministic bounds i.e. indefinite or large loop bounds, the model checker ascertains a small upper bound and unrolls the loops in accordance with the upper bound. Further, ascertaining the upper bound may be a time consuming and difficult task for the model checker as the model checker may lack sufficient intelligence for ascertaining such a bound. Thus, providing an inadequate, i.e., a smaller bound than required may cause a bounded model checker to produce results, such as a loop unrolling assertion failure. Additionally, in both the cases of a smaller bound and a larger bound the model checker may produce an "out of memory" failure. Therefore it may not be feasible to verify loops having indefinite or large bounds using a bounded model checker.

According to an implementation of the present subject matter, systems and methods for abstracting a data structure in a source code for model checking of the source code are described. The source code may be understood as a computer program written in a programming language. The systems and methods can be implemented in a variety of computing devices. The computing devices include, but are not limited to, desktop computers, hand-held devices, laptops or other portable computers, and the like. In one implementation, the systems and methods implementing data structure abstraction may be provided for data structure abstraction and subsequent model checking in programs written using programming languages including, but not limited to, C, C++, VC++, C#, and the like.

In one implementation, the source code received for abstraction may be analyzed to determine a data structure access in a loop having a loop body and a control statement. Further, other variables meaning non-data structure variables are identified in the loop. Furthermore, an abstract program corresponding to the original program may be generated. Herein, the source code received for abstraction is referred to as the original program, for the ease of understanding and for differentiating the received code (original program) from the abstract program/code. To generate the abstract program corresponding to original code, all data structure accesses in the source code are replaced by a representative element. Herein, the representative element may be any element of the data structure, thereby implying that the representative element may have same format and properties as that of other elements of the data structure. Additionally, the loop control statement may be replaced with a non-deterministic choice if statement. Further, non-deterministic assignment to all non-data structure variables is added at the start of the loop body and after the loop body. The method further generates the abstract program for model checking.

Herein, the loop control statement in the loop may be understood as an iterating condition for the data structure. The loop can be classified as a complete loop and a partial loop. A complete loop includes a plurality of conditions such that all the elements of the data structure are accessed. In a partial loop, a subset of data structure elements are accessed or iterated. The partial loops can be implemented in various ways, including, but not limited to, using conditional break statements or continue statements in a loop, or incrementing/decrementing the loop by an integer other than 1.

In one implementation, the data structure accesses in a loop in a computer program, such as C Program, is abstracted. In order to abstract the data structure in the computer program, each property to be verified on the data structure, referred to as 'a', can be determined and may be modelled as an assertion. Further, the computer program is sliced with respect to the property and the reduced sliced computer program is used for verification of the property 'a'. Loops with data structure accesses are removed and the data structure accesses are abstracted. The abstracted computer program is then analyzed using a model checker. If the model checker reports the property 'a' of the abstracted computer program as safe, then it can be safely concluded that the property 'a' is safe in the original computer program.

Further, the present data abstraction method replaces the loop header with appropriate an 'if condition' when the data structure access is in loop and introduces an 'if condition' when the data structure access is outside the loop body. Also, nested loops of the computer program are abstracted starting from the innermost loop body and proceeding to the outermost loop body of the computer program. Further, when the data structure access is in the loop, each non data structure variable is abstracted by assigning a non-deterministic value to it at the start of the abstract loop and after the loop body.

The systems and methods of the present subject matter thus facilitate in implementing data structure abstraction process in a program. The original program is replaced by another program, also referred to as an abstracted program/code, with no array and no loop. This ensures that the program is executed with reduced use of memory resource, processing resource, and time consumption and errors, such as dereferencing of illegal pointer. Further, the computer program may be abstracted into another computer program which allows all runs of the original computer program along with additional runs. Such an abstracted computer program may be called as an over-approximation of the original computer program. Therefore, if a property of the computer program is valid in the abstracted computer program, then it also holds in the original computer program. Furthermore, when an assertion is safe in the computer program after applying the data structure abstraction process, the model checker returns the assertion to be safe then the original computer program is safe with respect to that assertion.

These and other advantages of the present subject matter would be described in greater detail in conjunction with the following figures. While aspects of described systems and methods for data structure abstraction in a program can be implemented in different computing systems, environments, and/or configurations, the implementations are described in the context of the following exemplary system(s).

Figure 1:
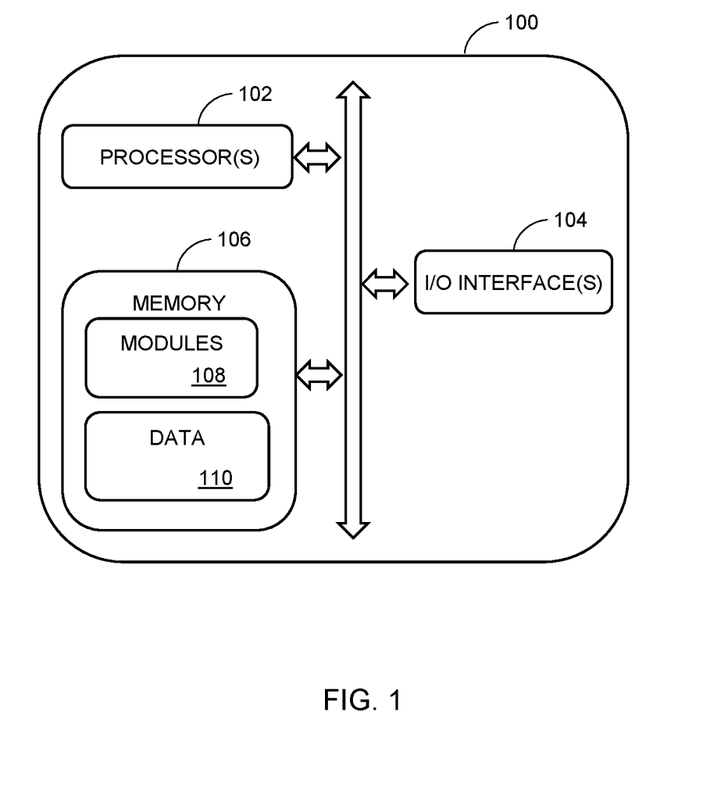
FIG. 1 illustrates block diagram of a system for data structure abstraction according to some embodiments of the present disclosure.

FIG. 1 illustrates a block diagram of a data structure abstraction system 100 implementing data structure abstraction in a program written in a programming language, in accordance with an implementation of the present subject matter. The data structure abstraction system 100 may be implemented in a computing device. Examples of the computing device include, but are not limited to, mainframe computers, workstations, personal computers, desktop computers, minicomputers, servers, multiprocessor systems, laptops, a cellular communicating device, such as a personal digital assistant, a smart phone, and a mobile phone; and the like. The data structure abstraction system 100, implemented using the computing device, includes one or more processor(s) 102, IO interface(s) 104, and a memory 106 coupled to the processor 102. The processor 102 can be a single processing unit or a number of units. The processor 102 may be implemented as one or more microprocessors, microcomputers, microcontrollers, digital signal processors, central processing units, state machines, logic circuitries, and/or any devices that manipulate signals based on operational instructions. Among other capabilities, the processor 102 is configured to fetch and execute computer-readable instructions and data stored in the memory 106.

Functions of the various elements shown in the figures, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or customized, may also be included.

The IO interfaces 104 may include a variety of software and hardware interfaces, for example, interface for peripheral device(s), such as a keyboard, a mouse, an external memory, and a printer. Further, the IO interfaces 104 may enable the computing device to communicate with other computing devices, such as a personal computer, a laptop, and like.

The memory 106 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 106 may also include module(s) 108 and data 110.

The module(s) 108 include routines, programs, objects, components, data structures, etc., which perform particular tasks or implement particular abstract data types. The module(s) 108 further include a data structure abstraction module, a model checker module and other module(s). The other module(s) may include programs or coded instructions that supplement applications and functions of the computing device.

The data 110, amongst other things, serves as a repository for storing data processed, received, and generated by one or more of the module(s) 108. The data 110 includes, for example, abstraction data, and other data. The other data includes data generated as a result of the execution of one or more modules in the other module(s).

In an embodiment, the computing device may receive a source code for abstraction. The source code may be referred to as a program or a software program. In an embodiment, the computing device may receive the source code from a compilation module. In various embodiments, the compilation module may be internal or external to the computing device.

On receiving the source code, the system 100 may be caused to identify one or more data structure accesses in the source code. The data structure accesses includes expressions for referencing elements of the data structures to access the data structure in the source code. Examples of the data structure accesses may include, but are not limited to, an array, a hash table, a graph, a tree, a class, a set, and a map.

The system 100 may further be caused to identify one or more loops in the one or more data structure accesses. A loop of the one or more loops includes a control statement and a loop body, such that the loop causes the loop body to be repeatedly executed based on the control statement. A loop statement may typically include among other things, an initializing condition, and a termination condition for the original loop.

The system 100 may further be caused to identify one or more loop-types in the one or more loops. The loop-types may include a complete loop and partial loop. A complete loop includes a loop iterating over all of elements of the data structure. A partial loop includes a loop iterating over a subset of elements of the data structure. The system 100 may further be caused to generate an abstracted code based on the one or more loop types. The abstracted code is capable of abstracting the data structure. In an implementation, the system 100 is capable of generating the abstracted code by abstracting the data structures present in the source code. For example, corresponding to a source code having arrays and loops iterating over said arrays, the system 100 is caused to transform the source code to a transformed program (or source code) that has an additional abstract element and index pair, $(v_a, i_a)$, corresponding to each array a with $n_a$ number of elements. In an embodiment, the transformation of the source code to the abstracted source code is obtained by assigning a non-deterministic value to $i_a$ in the range $[0 \ldots n_a-1]$.

In an embodiment, the transformation of the source code to the abstracted source code is obtained by modifying the one or more loops based on one or more loop types of said loops to obtain the abstracted code. In an embodiment, the loop types may include complete loops and partial loop. A complete loop includes a loop iterating over all of elements of the data structure and a partial loop comprises a loop iterating over a subset of elements of the data structure. According to condition 1, to generate the abstract data structure, the system can eliminate loop control statement of said loop operating on elements of the data structure based on loop type of said loop. In an embodiment, the system can eliminate the loop control statement of said loop by determining the loop type of said loop to be the complete loop. On said determination, the system 100 is caused to replace the loop control statement with an if(true) statement. The if(true) statement may include if expression, statements, end, and the if(true) statement evaluates an expression and executes statements when the expression is true. For example, the system replaces complete loops that refer to a, that is loop of the form for(i=0; i<$n_a$; i++) S, by i=$i_a$, $V_O$=*;S'; $V_O$=* is an assignment of non-deterministic values to all non-array variables modified in the loop body S.

In another embodiment, the system can determine the loop type of said loop to be the partial loop, and on said determination, the system 100 is caused to replacing the loop control statement with an if(non-deterministic) statement. A non-deterministic function may return same result any time it is called with a specific set of input values. For example, a partial loop can be replaced by if(*){Vo=*;S}Vo=*.

According to condition 2 (mentioned above), to generate the abstract data structure, the system 100 can replace the one or more data structure accesses by one of a corresponding representative element and a non-deterministic value in the loop body of said loop based on the elements accessed of the data structure. In an embodiment, the system 100 may initially determine a location of occurrence of the data structure access as one of a Left Hand Side (LHS) and Right Hand Side (RHS) of a statement of the source code. In an embodiment, on determination of the location of the occurrence of the data structure access to be RHS of the statement of the source code, the system 100 may be caused to determine whether the element that is accessed in a current iteration of said loop is associated with an iteration different from the current iteration of said loop. If it is determined that the element accessed in the current iteration is different from the element accessed in an iteration different from the current iteration, the system 100 replaces the one or more data structure accesses by the corresponding non-deterministic value. For example, each array access, a[e], in the RHS of an assignment is replaced by the expression $i_a$==e'?$v_a$: 8, where * is a non-deterministic value.

In an embodiment, determination of the location of the occurrence of the data structure access to be LHS of the statement of the source code, the system 100 may be caused to replace the one or more data structure accesses by the corresponding representative element. For example, each assignment to an array element of the form a[e]=$e'_1$ is replaced by $e'=i_a?v_a=e'_1: e'_1$.

Also, according to condition 3 to generate the abstract data structure, the system 100 can add a plurality of non-array assignments at a start of the loop body and after the loop body of the source code. In an embodiment, prior to adding plurality of non-array assignments, the system 100 is caused to identify the non-data structure variables in the loop body in LHS. Upon identifying, the system 100 is caused to assign the non-data structure variables in the loop body in LHS.

An example for data structure abstraction is provided below, where Example 1.1 is an original source code and an example 1.2 is an abstracted source code corresponding the original source code of Example 1.1.

Example 1.1

Example 1.1 contains an original input source code:

```
1    struct S {
2        unsigned int p;
3        unsigned int q;
4    } a[1000];
17   main ( )
18   {
19       for (int i = 0; i<1000 ; i++)
20       {
21           a[i].p = 0;
22           a[i].q = 0 ;
23       }
25       while (nd(0,1))
26       {
27           i = nd(0,999);
28           k = nd(0,1000);
29           a[i].p = k;
30           a[i].q = k * k ;
31       }
32       for (int i=0; i< 1000; i++)
33       {
34           assert(a[i].q == a[i].p
35               || a[i].q == acc[i].p * acc[i].p);
36       }
37   }
```

In example 1.1, an original software code (or program) with an array of structure, a, where nd(I,u) returns a non-deterministic value in the range [I::u]. In this example, each field of all elements of the array are initialized to zero in the loop (at line 19) and then in another loop (at line 25), for an arbitrary subset of elements, the field q is set to square of the field p. The last loop (at line 32) asserts that for each element either q equals p or q equals $p^2$. This is not a linear property and hence the existing techniques that discover linear invariants or those that rely on decidable theories which cannot discover the data structure invariant. Bounded model checkers are effective at discovering such invariants, however as previously discussed; the bounded model checkers cannot handle loops with large bounds.

A transformed program (example 1.2) corresponding to the example 1.1 is provided. In the transformed code each array access is replaced by x. Herein, x is the abstract variable corresponding to the array a. At the point of assertion, two values of x reach $-x:p=0\hat{\ }x:q=0$ and $x:p=k\hat{\ }x:q=k\_k$. In the original program, if the assert is violated it can be violated for some index $i_0$ and the values for $a[i_0]$ can reach from either from the initialization or from the point where $a[i_0]:p$ and $a[i0]:q$ are assigned k and k*k, respectively. Thus, for this example if the property is violated in the original program it will be violated for some $i_0$ and there will be a run of the abstract program in which x takes the same path as the one taken by $a[i_0]$ in the original program and hence the transformed program can also violate the property. In this particular example, if the property does not hold for the transformed program, then it cannot for the original program too. However, this may not be true generally in all the cases. The transformed code is shown below (example 1.2).

Example 1.2

Example 1.2 contains the abstracted source code corresponding to the original input source code of Example 1.1

```
struct S
{
    unsigned int p;
    unsigned int q;
}x;
int i_x,i,k;
main ( )
{
    i_x = nd(0,999);
    i = i_x;
    i == i_x? x.p = 0 : 0;
    i == i_x? x.q = 0 : 0;
    i = *;
    if(nd(0,1))
    {
        i = nd(0,999);
        k = nd(0,1000);
        i == i_x? x.p = k : k;
        i == i_x? x.q = k * k : k*k ;
    }
    i = nd(0,1000);
    k = nd(0,1000);
    i = i_x;
    assert( i == i_x? x.q == x.p
                || x.q == x.p * x.p : nd(0,1));
}
```

As seen in the source code of example 1.1, the code of the original program:

```
for (int i = 0; i<1000 : i++)
{
    a[i].p = 0:
    a[i].q = 0 :
}
```

The code below illustrates abstraction (in example 1.2) when the data structure access is in a complete loop.

```
i_x = nd(0.999);
i = i_x;
i == i_x? x.p = 0 : 0;
i == i_x? x.q = 0 : 0;
i = *;
```

As seen in the source code of example 1.1, the code of the original program

```
while (nd(0,1))
{
    i = nd(0,999);
    k = nd(0,1000);
    a[i].p = k;
    a[i].q = k * k ;
}
```

The code below illustrates abstraction (in example 1.2) when the data structure access is in a partial loop:

```
if(nd(0,1))
{
    i = nd(0,999);
    k = nd(0,1000);
    i == i_x? x.p = k : k;
    i == i_x? x.q = k * k : k*k ;
}
```

In an embodiment, the system 100 is caused to provide the abstracted code for the model checking. An example describing the generation of the abstracted code based on the conditions such as the condition 1, condition 2 and condition 3 is described with reference to an example below.

Further, the computer program with the abstracted data structure thus obtained may be saved by the processor 102 in the abstraction data. Further, the program with the abstracted data structure may be provided to a model checker module for being analyzed for errors. Providing the program with the abstracted data structure to the model checker module helps in facilitating the abstract program with abstract data structure and the input function for analysis and checks if the input assertion or property of the computer program is safe or not. If it is safe, then the process is stopped otherwise it produces a trace.

Although the present subject matter has been defined with reference with to a "while loop" and a "for loop", it will be understood that the computing device implementing the data structure abstraction may be used for data structure abstraction in other types of loops as well, albeit with few modifications/alterations as will be understood by a person skilled in the art.

Although the present subject matter has been defined in reference with programs written in C language, it will be understood that the computing device implementing the data structure abstraction may be used for data structure abstraction in programs written using other programming languages, albeit with few modifications.

Although the present subject matter (including the examples) have been defined in reference with to arrays, it will be understood that the computing device implementing the data structure abstraction may be used for data structure other than arrays.

Figure 2:
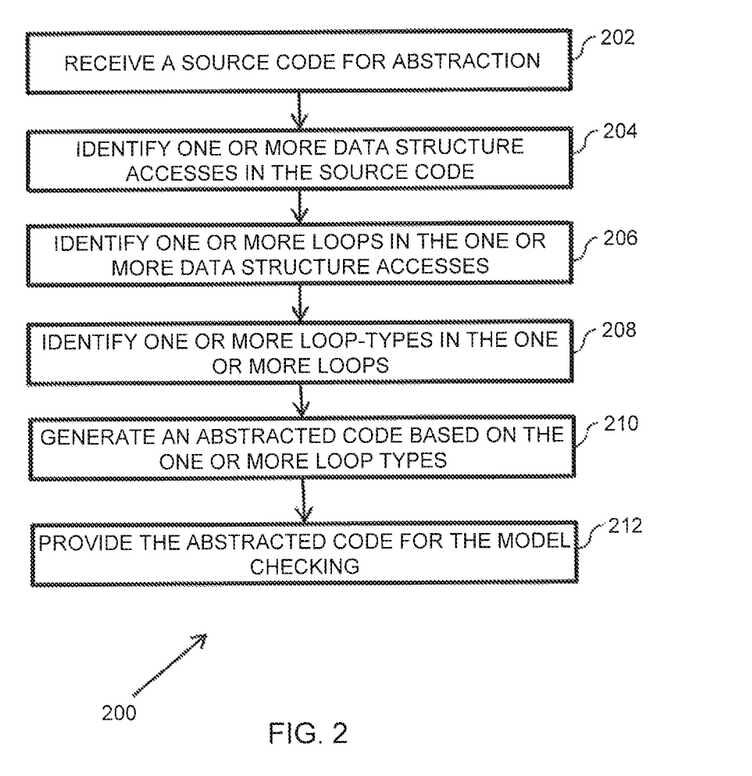
FIG. 2 is a flow diagram of a method for data structure abstraction according to some embodiments of the present disclosure.

FIG. 2 illustrates an example method 200 for abstraction of data structures for model checking of a computer program, in accordance with an example embodiment. In method 200, at 202 a source code or computer program may be received for abstraction. In an embodiment, the IO element 104 may cause receipt of the source code. At 204, one or more data accesses are identified in the source code via one or more hardware processors, such as the processor 102. The one or more data structure accesses includes expressions for referencing elements of the data structures to access the data structure in the source code. In an embodiment, a data structure access may include one of an array, a hash table, a graph, a tree, a class, a set, and a map. At 206, one or more loops are identified in the one or more data structure accesses via one or more hardware processors, such as the processor 102. A loop includes a control statement and a loop body, wherein the loop causes the loop body to be repeatedly executed based on the control statement.

At 208, one or more loop-types are identified in the one or more loops via one or more hardware processors, such as the processor 102. In an embodiment, the loop types includes complete loops and partial loop. Examples of the complete loop and the partial loop are described with reference to FIG. 1. At 210, an abstracted code is generated based on the one or more loop types via one or more hardware processors. The abstracted code is capable of abstracting the data structure. The abstracting of the data structure includes performing one of the following for each loop of the one or more loops:

Replacing the one or more data structure accesses by one of a corresponding representative element and a non-deterministic value in the loop body of said loop based on the elements accessed of the data structure.

In an example embodiment, a location of occurrence of the data structure access is determined. For example, the location of occurrence of the data structure can be one of a left hand side (LHS) and right hand side (RHS) of a statement of the source code. In an embodiment, if the location of the occurrence of the data structure access is determined to be the RHS of the statement of the source code, it is determined whether the element accessed is associated with an iteration different from a current iteration of said loop. If it is determined that the element accessed is different from the current iteration of said loop, the one or more data structures accesses are replaced by the corresponding non-deterministic value. Eliminating loop control statement of said loop operating on elements of the data structure based on loop type of said loop.

In an example embodiment, where the loop type of said loop is determined to be the complete loop, the loop control statement is replaced with an if (true) statement to eliminate the loop control statement. In another example embodiment, where the loop type of said loop is determined to be the partial loop, the loop control statement is replaced with an if (non-deterministic) statement to eliminate the loop control statement.

Adding a plurality of non-array assignments at a start of the loop body and after the loop body of the source code. An example of adding the non-array assignments at the start of the loop body and after the loop body of the source code is described with reference to FIG. 1. At 212, the method 200 includes providing the abstracted code for the model checking.

The disclosed method and system for data structure abstraction allows in verifying the programs with assertions involving data structures. The method and system disclosed herein provides data structure abstraction by eliminating loops that operate on array elements. The abstraction is implemented via syntactic transformation of programs. In the data structure abstraction process, data structure access replacement replaces each data structure access with a representative element or non-deterministic value. The loops with data structure access are replaced with appropriate if condition. All other variables modified in the loop are assigned with non-deterministic value. If an assertion 'a' is not violated for the representative elements, it holds for whole of data structure, since the data structure abstraction process assigns non-deterministic or abstracted values to all variables including the representative element. Thus, the program code generated after applying data structure abstraction process is a sound over-approximation of the original program. The transformed program is input to a bounded model checker for verification.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for array abstraction in a source code for model checking of the source code, the method comprising:

receiving a source code for abstraction, via one or more hardware processors;

identifying one or more array accesses in the source code, via the one or more hardware processors, the one or more array accesses comprising expressions for referencing elements of an array to access the array in the source code;
identifying one or more loops with the one or more array accesses, via the one or more hardware processors, a loop of the one or more loops comprising control statement and a loop body, wherein the loop causes the loop body to be repeatedly executed based on the control statement;
identifying one or more loop-types of the one or more loops, via the one or more hardware processors;
generating, via the one or more hardware processors, an abstracted code based at least on the one or more loop types, wherein generating the abstracted code comprises performing, for each loop of the one or more loops:
replacing an array access of the one or more array accesses by one of an element of the array being accessed in an iteration of said loop, and a non-deterministic value in the loop body of said loop based on the elements of the array being accessed in the iteration of said loop,
eliminating a loop control statement of said loop operating on the elements of the array based on a loop type of said loop, and
adding a plurality of non-array assignments at a start of the loop body and after the loop body of the source code; and
model checking, via the one or more hardware processors, the abstracted code.

2. The method of claim 1, wherein an array a access of the one of more array accesses comprises one of an array, an hash table, a graph, a tree, a class, a set, and a map.

3. The method of claim 1, wherein the one or more loop types comprises a complete loop and a partial loop, wherein the complete loop comprises a loop iterating over all of the elements of the array and the partial loop comprises a loop iterating over a subset of the elements of the array.

4. The method of claim 3, wherein eliminating the loop control statement of said loop comprises:
determining the loop type of said loop to be the complete loop; and
replacing the loop control statement with an if (true) statement.

5. The method of claim 3, wherein eliminating the loop control statement of said loop comprises:
determining the loop type of said loop to be the partial loop; and
replacing the loop control statement with an if(non-deterministic) statement.

6. The method of claim 1, further comprising determining a location of occurrence of the array access, the location being one of a Left Hand Side (LHS) and Right Hand Side (RHS) of a statement of the source code.

7. The method of claim 6, wherein on determination that the location of occurrence of the array access to be the RHS of the statement of the source code, the method further comprises:
determining the accessed element such that the accessed element is associated with an iteration different from the iteration of said loop; and
replacing the one or more array accesses by a corresponding non-deterministic value.

8. The method of claim 6, wherein on determination that the location of occurrence of the array access to be the LHS of the statement of the source code, the method further comprises:
replacing the one or more array accesses by the element being accessed in the iteration of said loop.

9. The method of claim 6, further comprising prior to adding the plurality of non-array assignments at the start of the loop body and after the loop body of the source code:
identifying non-array variables in the loop body in the LHS of the statement; and
assigning corresponding non-deterministic values to the non-array variables.

10. A system for array abstraction in a source code for model checking of the source code comprising:
one or more memories; and
one or more hardware processors, the one or more memories coupled to the one or more hardware processors wherein the one or more hardware processors are configured to execute programmed instructions stored in the one or more memories to:
receive a source code for abstraction;
identify one or more array accesses in the source code, the one or more array accesses comprising expressions for referencing elements of the array to access the array in the source code;
identify one or more loops with the one or more array accesses, a loop of the one or more loops comprising control statement and a loop body, wherein the loop causes the loop body to be repeatedly executed based on the control statement;
identify one or more loop-types of the one or more loops;
generate an abstracted code based at least on the one or more loop types, the abstracted code capable of abstracting the array, wherein to generate the abstracted code, the one or more hardware processors executes programmed instructions to perform, for each loop of the one or more loops:
replace, an array access of the one or more array accesses by one of an element of the array being accessed in an iteration of said loop, and a non-deterministic value in the loop body of said loop based on the elements of the array being accessed in the iteration of said loop,
eliminate a loop control statement of said loop operating on the elements of the array based on a loop type of said loop, and
add a plurality of non-array assignments at a start of the loop body and after the loop body of the source code; and
model check the abstracted code.

11. The system of claim 10, wherein an array access of the one of more array accesses comprises one of an array, an hash table, a graph, a tree, a class, a set, and a map.

12. The system of claim 10, wherein the one or more loop types comprises a complete loops and partial loop, and wherein a complete loop comprises a loop iterating over all of elements of the array and a partial loop comprises a loop iterating over a subset of elements of the array.

13. The system of claim 12, wherein to eliminate the loop control statement of said loop, the one or more hardware processors are configured to execute the programmed instructions to:
determine the loop type of said loop to be the complete loop; and
replace the loop control statement with an if (true) statement.

14. The system of claim 13, wherein to eliminate the loop control statement of said loop, the one or more hardware processors are configured to execute the programmed instructions to:
  determine the loop type of said loop to be the partial loop; and
  replace the loop control statement with an if(non-deterministic) statement.

15. The system of claim 10, wherein the one or more hardware processors are configured to execute the programmed instructions to determine a location of occurrence of the array access, the location being one of a Left Hand Side (LHS) and Right Hand Side (RHS) of a statement of the source code.

16. The system of claim 15, wherein on determination that the location of occurrence of the data structure access to be the RHS of the statement of the source code, the one or more hardware processors are configured to execute the programmed instructions to:
  determine the accessed element such that the accessed element is associated with an iteration different from the iteration of said loop; and
  replace the one or more array accesses by a corresponding non-deterministic value.

17. The system of claim 15, wherein on determination that the location of occurrence of the array access to be the LHS of the statement of the source code, the one or more hardware processors processors are configured to execute the programmed instructions to:
  replace the one or more array accesses by the element being accessed in the iteration of said loop.

18. The system of claim 15, prior to adding the plurality of non-array assignments at the start of the loop body and after the loop body of the source code, the one or more hardware processors are configured to execute the programmed instructions to:
  identify non-array variables in the loop body in the LHS of the statement; and
  assign corresponding non-deterministic values to the non-array variables.

19. A non-transitory computer-readable medium having embodied thereon a computer program for executing a method for array abstraction in a source code, for model checking of the source code, the method comprising:
  receiving a source code for abstraction;
  identifying one or more array accesses in the source code, the one or more array accesses comprising expressions for referencing elements of an array to access the array in the source code;
  identifying one or more loops in the one or more array accesses, a loop of the one or more loops comprising control statement and a loop body, wherein the loop causes the loop body to be repeatedly executed based on the control statement;
  identifying one or more loop-types of the one or more loops;
  generating an abstracted code based at least on the one or more loop types, the abstracted code capable of abstracting the array, wherein abstracting the data structure comprises performing, for each loop of the one or more loops:
    replacing, an array access of the one or more array accesses by one of an element of the array being accessed in an iteration of said loop, and a non-deterministic value in the loop body of said loop based on the elements of the array being accessed in the iteration of said loop,
    eliminating a loop control statement of said loop operating on the elements of the array based on a loop type of said loop, and
    adding a plurality of non-array assignments at a start of the loop body and after the loop body of the source code; and
  model checking the abstracted code.

* * * * *